United States Patent
Schmidt (10) Patent No.: US 8,066,154 B2
(45) Date of Patent: Nov. 29, 2011

(54) DEVICE FOR CONTROLLED METERING OF SEMI SOLID FOOD PRODUCTS

(76) Inventor: Norman Schmidt, Burnaby (CA)

(*) Notice: Subject to any disclaimer, the term of this patent is extended or adjusted under 35 U.S.C. 154(b) by 685 days.

(21) Appl. No.: 11/905,342

(22) Filed: Sep. 28, 2007

(65) Prior Publication Data

US 2008/0135582 A1 Jun. 12, 2008

Related U.S. Application Data (60) Provisional application No. 60/848,374, filed on Oct. 2, 2006, provisional application No. 60/852,423, filed on Oct. 18, 2006.

(51) Int. Cl.
*G01F 11/00* (2006.01)

(52) U.S. Cl. ........................ 222/272; 222/342

(58) Field of Classification Search .............. 222/272, 222/342, 271, 281, 414, 333, 280, 410–412; 426/496, 502–504, 512
See application file for complete search history.

(56) References Cited

U.S. PATENT DOCUMENTS

| | | | | | |
|---|---|---|---|---|---|
| 216,617 | A | * | 6/1879 | Jaquett | 222/281 |
| 1,890,533 | A | * | 12/1932 | Sollich | 426/517 |
| 1,985,275 | A | * | 12/1934 | Baccellieri | 425/194 |
| 2,246,106 | A | * | 6/1941 | Patt | 384/217 |
| 2,321,082 | A | * | 6/1943 | Harshberger | 222/225 |
| 3,196,913 | A | * | 7/1965 | Stahmer | 83/867 |
| 3,245,110 | A | * | 4/1966 | Daubenfeld | 366/83 |
| 3,326,144 | A | * | 6/1967 | Palmer | 222/281 |
| 3,486,484 | A | * | 12/1969 | Bullough | 118/636 |
| 3,565,014 | A | * | 2/1971 | Fausto Celorio Mendoza et al. | 425/101 |
| 4,083,668 | A | * | 4/1978 | Bardwick et al. | 425/194 |
| 4,211,492 | A | * | 7/1980 | Konig et al. | 366/76.5 |
| 4,498,635 | A | * | 2/1985 | Fielding | 241/94 |
| 5,516,011 | A | * | 5/1996 | Fielding | 222/281 |
| 5,733,583 | A | * | 3/1998 | Muller | 425/145 |
| 5,811,145 | A | * | 9/1998 | Morikawa | 426/503 |
| 5,824,349 | A | * | 10/1998 | Muller | 425/145 |
| 5,919,495 | A | * | 7/1999 | Fletcher et al. | 425/238 |
| 6,050,456 | A | * | 4/2000 | Soper et al. | 222/272 |
| 6,344,227 | B1 | * | 2/2002 | Schmidt | 426/503 |
| 7,182,588 | B2 | * | 2/2007 | Lambauer et al. | 425/101 |
| 7,442,026 | B2 | * | 10/2008 | Shulski et al. | 425/237 |
| 2005/0257692 | A1 | * | 11/2005 | Marcato | 99/353 |

FOREIGN PATENT DOCUMENTS

GB 2039266 * 1/1979

* cited by examiner

*Primary Examiner* — Kevin P Shaver
*Assistant Examiner* — Donnell Long
(74) *Attorney, Agent, or Firm* — Tangent Law Group, PLLC; Eric J. Weierstall, esq.

(57) ABSTRACT

A device that provides better movement of semi solid materials such as but not limited to food products for metered dispensing. The device is able to take bulk semi solid material, entrain or draw the material into the device and add pressure to the semi solid material so that the semi solid material may be passed thru a nozzle or controlled discharge metering device or orifice. The rollers have circumferential grooved profiles and scrapers that are able to actively remove the semi-solid materials from the grooved profiles. The emitted semi solid material can then be more accurately applied or portioned in a metered fashion. Typical applications include but are certainly not limited to the production of cookies from bulk dough, the application of icing to a cake base/body/top or perimeter, metering of dough for bread or rolls so as to allow for a cutting device to cut off into uniform pieces.

25 Claims, 7 Drawing Sheets

PRIOR ART

PRIOR ART

DEVICE FOR CONTROLLED METERING OF SEMI SOLID FOOD PRODUCTS

CROSS-REFERENCE TO RELATED APPLICATIONS

This application claims the priority of U.S. provisional patent applications 60/848,374, filed Oct. 2, 2006, and 60/852,423, filed Oct. 18, 2006, which are incorporated herein by reference.

BACKGROUND OF INVENTION

In the production of food products such as cookies, candies, icing of cakes, layering of butter into pastry dough and other food and non food products that may be a semi solid materials there is always a need to pump or move the bulk material and metered it out. Existing units use two counter rotating horizontally profiled rollers to entrain product and extrude it out thru a specific profile. The roller design is widely accepted in that it does not impart any grinding or mashing of the material being processed, as an example when making chocolate chip cookies the chocolate chips pass between the gap between the two rollers without crushing or grinding, by comparison an auger, lobe or gear style pump would crush or grind up the chocolate chips.

These machines have several applications, some non-limiting examples include for instance the production of cookies and candy materials, where these machines force the materials through die nozzles to emerge as a continuous stream of product that are cut at uniform increments. Another non-limiting example includes icing a cake, the icing is forced thru a long narrow slot to produce the sheet of icing that will then cover or be applied to a cake. Another non-limiting example is pastry manufacture. With pastry, buttery or fatty material is extruded into a sheet to go onto the dough which is then layered, typically by folding repeatedly and rolling thin multiple times to produce the thin layers of dough that have a flaky nature after baking.

Basic devices of this type have been produced in the past but the roller profiles on these previous machines resulted in numerous issues. The rollers of these devices typically have grooves or saw tooth profiles running across the face of the rollers, in a horizontal or longitudinal direction parallel with the axis of rotation of the roller. These profiles tend to add a degree of grip or traction so as to grip the material introduced. As the two rollers counter rotate towards and past the pinch point or convergence point of the rollers the entrained material will pass thru this pinch point or point of convergence so as to impart a degree of pressure on the material in the area just beyond the roller pinch point. Thus, as the material exits the rollers it can be forced through a nozzle or orifice at pressure.

The traction or grip of these horizontal grooves being effectively limited to the shear strength of the material were therefore not able to produce as high an extruding pressure as may be needed in some applications. Further shortcomings from the horizontal profiled rollers also includes impediment of the pressures that can be attained as well as allowing for leakage of the entrained medium around the surface of the profiled roller. As the horizontal profiles require clearance between the profile and the exit passage, typically a die block, this gap prevents a positive seal between these components. The inability to create a positive seal between these surfaces leads to leakages of semi solid materials between the rollers and die blocks. The resulting leakage producing an undesirable sanitation or hygenic condition as well as producing scaling deviations or inconsistencies in the output. The previous profiles were also of a shape and nature such that there could never be made a positive seal against the profile or roller surface.

The short comings of these previous art machines are numerous. As noted above, they include a reduced tractive capability and lower feed pressures being achieved by the action of the counter rotating horizontal grooved rollers. The pressures can be so low that it is often times barely adequate to force the material through the nozzle. With some of the materials, such as buttery materials or materials with high fat contents, if for any reason the material chokes or does not flow through the nozzle at the full rate then slippage of the material relative to the roller surface occurs. Any slippage at this interface causes the semi solid or viscous material to become less viscous. Slippage in these materials generates frictional heat which causes the materials to further soften at the interface of the semi solid material to the horizontal grooved roller. Therefore the slippage increases and material flow is further reduced with a compounding effect.

In addition, when material flow decreases, either through slippage or leakage, then the discharge thru the nozzle decreases in those machines. This in turn causes a decrease in the size of the pieces that are cut from the exiting stream of materials since the cutting operation is normally on a timed cycle or is gauged to the rotation of the two counter rotating grooved rollers. In the case of icing being dispensed for a cake this slippage and reduced flow results in a sheet or film of icing that either comes out at a rate slower than that of the cake, for example, that the icing is to be deposited onto or the sheet or film of icing thins, tears or pulls, with the results being incorrectly iced cakes.

A need therefore exists for a device that would exhibit a high degree of traction on the semi viscous or semi solid material to be moved so that slippage would not occur or would be minimized. It would also need to provide this high traction and/or resulting higher post roller pressure without producing any negative side effects such as the grinding, crushing, or smearing of the material or any inclusions that may be within or suspended within the semi solid material. Additionally, it should provide for both a positive seal to maintain consistent through put of material, remove entrapped materials from the groves of the rollers, eliminate or minimize leakage and thereby prevent recirculation of these materials and or scaling deviations

SUMMARY OF THE INVENTION

With the instant invention described hereafter, it may be seen that by utilizing a different profile than that of previous machines it is possible to provide a greater degree of traction or increased medium pressure and to provide for more consistent product flow and thereby portion scaling, while still allowing for passage of inclusions or suspended materials with little or no resulting damage to the included or suspended materials. A further feature of the exemplary embodiments would be in the increased hygienic operation of the metering or dispensing device by utilizing a positive seal scraper which removes any retained materials from the tractive grooves of the feed rollers.

The instant invention utilizing two parallel counter rotating rollers to grip, entrain and extrude semi solid materials out of a profiled orifice. The rollers utilize a plurality of circumferential tractive grooves running around the diameter of the roller and then repeated across the face of the roller. The circumferential tractive grooves also providing an ability to utilize a scraper which contains a profile to match the grooves.

The combination of grooved roller and profiled scraper allows for obtaining higher extrusion pressures with better operating characteristics as well as more sanitary operation.

An object of the invention is to provide increased traction by added surface area and depth of a grooved, circumferential profile where semi solid materials can be pressed into and operating pressures or forces can hold to groove surfaces and provide better scaling due to reduced slippage.

A further object is to provide a circumferential profile that can allow for a positive seal with a scraper and better scaling through reduced leakage and prevention of recirculation of the semi-solid food materials in grooves or on roller faces.

Yet another object is to provide for the venting out air pockets and allow for passage of air that can flow in front of dough as it moves down into the grooves, allowing for better scaling due to removal of air pockets in product stream.

The invention includes an article of manufacture, an apparatus, a method for making the article, and a method for using the article.

The method of the invention includes A method for metering and dispensing semi-solid food material in controlled amounts, comprising the steps of preparing the semi-solid food material and depositing same in a hopper and entraining said semi-solid food material in between two counter rotating feed rollers with grooved, circumferential profiles, the rollers being in communication with the hopper, wherein the semi-solid food material is spread between the grooves within the circumferential profile and held therebetween, and moving said semi-solid food material through a convergence point between the counter rotating feed rollers, the movement pushing at least a portion of the semi-solid material into communication with an at least one scraper in communication with the roller to remove the portion of the semi-solid food material from the roller, and ejecting said semi-solid food material, both the portion that was in communication with the scrapers and the remaining portion, through an at least one die block having an at least one nozzle.

The entrainment and movement steps with the at least one scraper may provide that the at least one scraper is in intimate communication with the grooved circumferential profile such that it makes a positive seal with said two counter rotating feed rollers having said circumferential profiles.

The apparatus of the invention includes a metering device dispensing semi-solid food material in controlled amounts, having a hopper containing wherein the semi solid food material is placed with two counter rotating feed rollers with matched, grooved circumferential profiles, the two counter rotating feed rollers each having a horizontal centerline for each grooved profile the rollers being in a roller section communicating with the hopper and mechanically driven in a counter rotating fashion and two scrapers matching the grooved circumferential profile of and in communication with each of the counter rotating feed rollers and an at least one die block and an at least one die nozzle coupled to and communicating with the two scrapers, wherein when the semi-solid food material is in contact with the counter rotating feed rollers the mechanically induced rotation of the counter rotating feed rollers causes the semi solid food material to become entrained by the counter rotating feed rollers with circumferential profiles and moves the entrained semi-solid food material downward due to the rotation of the feed rollers and as the semi solid material moves with the rotation of the respective feed rollers the semi solid material comes towards the center of the roller section between the feed roller center lines and is fed out past the scrapers through the at least one die block and the corresponding at least one die nozzle.

The metering device can also have the two matching grooved circumferential profiled scrapers in intimate contact with the grooved circumferential profiles of the counter rotating rollers such that a positive seal is provided preventing recirculation of entrained semi-solid food material. The grooved circumferential profiles of the counter rotating rollers can extend the length of the counter rotating rollers. The two scrapers can extend and match the length of the profiles on the two counter rotating rollers.

The grooved circumferential profiles of the two counter rotating rollers can form a radius and the at least one die block includes the two matching grooved circumferential profiled scrapers mounted thereon and can have an identical radius machined into the two scrapers from front to back thereon. The semi-solid material can flow through the die block and the at least one nozzle with a positive pressure.

The device can further comprise a non-stick surface on the at least one die block or the at least one die nozzle or a non-stick insert for the inner surface of at least one of the at least one die nozzles. The non-stick coating can be Teflon.

The semi viscous material can be, but certainly is not limited to, one of a chocolate coated candy centers, cookies, cookies with inclusions, hot cross buns, brownie batter, icing, dough, and dough with inclusions. The profiles can be substantially perpendicular to the horizontal centerlines of the counter rotating rollers or substantially vertical relative to the orientation of the counter rotating rollers.

The circumferential profiles can further comprise grooves with profiles having high points or crests and low points or valleys, the profiles of the circumferential rollers entraining the semi solid material in the high points or crests and low points or valleys across the surface of counter rotating feed rollers. The semi-solid food material can be spread between the grooves within the circumferential profile and held therebetween with increased pressure.

The entrainment of the semi solid material within the vertically oriented profiles together with the counter rotational movement of the counter rotating feed rollers pushes the entrained semi solid material down to a convergence point between the two counter rotating feed rollers. The distance between the roller surfaces can be proportional to the viscosity and the depth of the semi solid material in contact with the roller faces.

The mechanically driven rotation of the rollers can move the semi-solid food materials down and inwards towards a pinch point of the two counter rotating rollers, the movement from the hopper to the convergence point causing the medium to first enter and fill or wedge into the grooves of the circumferential profiles of the two counter rotating feed rollers.

The metering device for dispensing semi-solid food material in controlled amounts of claim 11, wherein the size and shape of the contoured profiles are varied based on the type of semi solid material. The profiles of the two counter rotating feed rollers can also be matched such that the high points in each profile are matched opposite one another. The profiles of the two counter rotating feed rollers can also be matched such that the high point of one meets the low point in the other.

The grooves in the profiles can have, but are certainly not limited to having, a groove radius with a widths of between about $1/32$ to $1/8$ of an inch with a pitch width of between about $1/8$ to $1/2$ of an inch with and $1/16$ to $1/4$ of an inch separations between the two counter rotating feed rollers.

The metering device can further include an adjustment mechanism or substitution mechanism allowing for the adjustment or substitution of at least one of the two counter rotating feed rollers to adjust the width of the pinch point.

The metering device where the grooves are formed from one of a parabolic root with parabolic top section, a parabolic root with flat top section, or a v profile with a v-shape cut into the roller with the bottom of the v-shape having a radiused bottom or a sharp bottom and the tops having flat sections or sharpened sections as tops.

The metering device for dispensing semi-solid food material wherein the two scrapers produce a positive seal with the respective two counter rotating rollers, thereby increasing operating pressure and providing positive containment of the semi-solid material.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features and reference is made to non-limiting exemplary embodiments of the instant invention.

DETAILED DESCRIPTION OF THE INVENTION

The embodiments and examples discussed herein are non-limiting examples. Reference is made to the exemplary embodiments of the figures, however, these embodiments are non-limiting illustrations of the invention as described.

Figure 1:
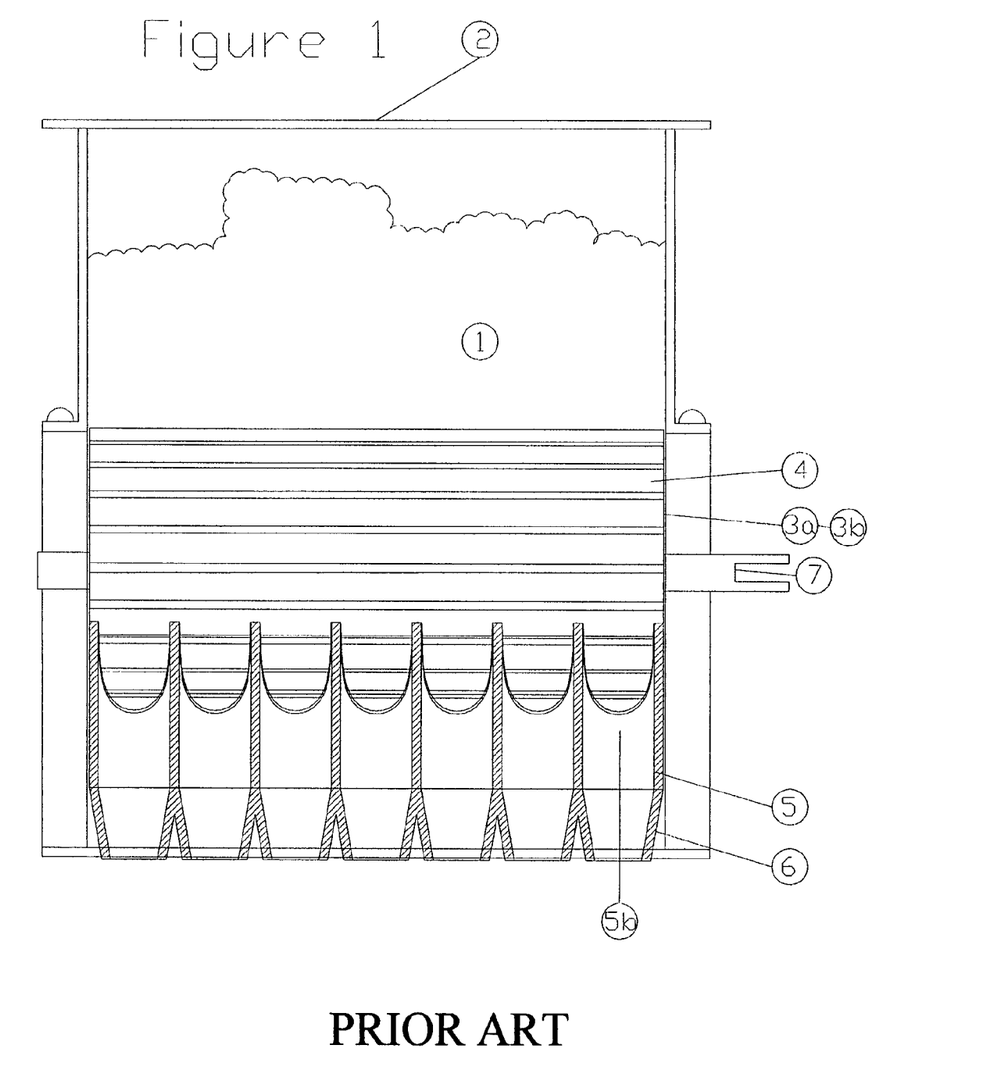
FIG. 1 shows a side view of a prior art device.
Figure 2:
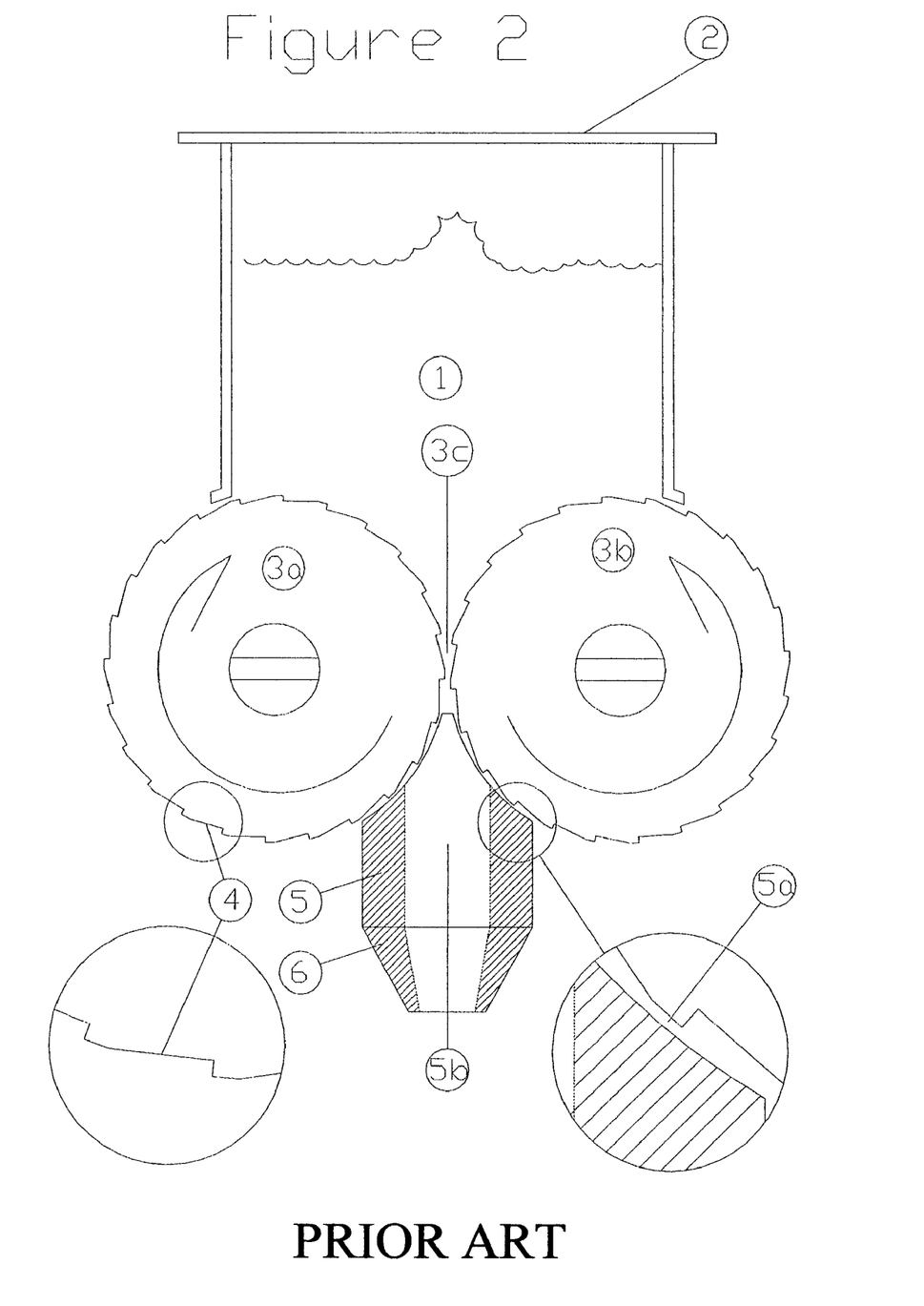
FIG. 2 shows an open front view of the prior art device of FIG. 1.

FIG. 1 shows a side view of a prior art device. A typical prior art machine provides two parallel counter rotating rollers which thru mechanically induced drive would counter rotate and thereby entrain semi solid materials into the pinch area between the rollers and then extrude it out of a die assembly or multiple die nozzles located downstream of the rollers. With prior art machines as shown in FIG. 1 and FIG. 2 (open front view) the semi solid material 1 is placed in the hopper 2 located above the two counter rotating feed rollers 3a, 3b. The counter rotating feed rollers 3a, 3b typically have horizontally or longitudinally oriented matched profiles to provide traction on the semi solid material.

Rotation of the feed rollers 3a, 3b in the shown angular movement would result in the bulk material being entrained by the feed rollers 3a, 3b profiles and brought down and towards the die block 5. To assist in this movement of semi solid material 1 and increase pressure, longitudinal grooves 4, for example, are cut into the surface of the counter rotating feed rollers 3a, 3b as profiles. These grooves 4 do provide an increase in the traction or gripping ability of the feed rollers 3a, 3b by pressing some of the semi solid material 1 into the longitudinal grove 4 where it tends to adhere to the surface and contour of the longitudinal groove 4. This adhering semi solid material 1 then in turn tends to grip subsequent bulk semi solid material 1 in the hopper 2 and thru the mechanically induced rotation of the counter rotating feed rollers 3a, 3b drive the semi solid material 1 thru between the pinch point 3c of the counter rotating feed rollers 3a, 3b into area of the die block 5.

The surface of the die block 5 is machined to match the rotational path of the counter rotating feed rollers 3a, 3b with an increment of clearance 5a between the die block 5 and to the counter rotating feed rollers 3a, 3b to accommodate mechanical clearance between the longitudinal groove 4 of the rollers 3a, 3b and the die block 5. The position of the die block 5 to the rollers causes the majority of the semi solid material 1 to be removed from the entraining surface of the counter rotating feed rollers 3a, 3b thru a shearing action and directs the semi solid material 1 to pass down the die block 5 to discharge dies 6. However, there is no way to provide a positive seal at the die block 5 or clear the semi solid material 1 in the longitudinal profile 4. Once the semi solid material 1 passes out the end of the die 6 it may be cut or stripped from this die to produce the desired portioned product such as but no limited to cookie portions, granola bars, icing sheets for a cake covering or the like.

As can be deduced from the description and viewed from FIG. 1, there is a degree of friction or drag that occurs when the semi solid material 1 is forced to move against the contact surfaces of the die block 5 and the die nozzles 6. To operate properly the tractive force of the counter rotating rollers 3a, 3b and the semi solid material 1 passing there through must be greater than the drag or friction force of the discharging of the semi solid material 1. In the operation these heretofore known devices this tractive force may be only slightly higher than the drag force that it must overcome and therefore the semi solid materials may bind in the die block 5 or discharge dies 6. If the drag force of the die block 5 and the nozzles 6 is greater than the tractive force then slippage can occur at the feed rollers 3a, 3b which will cause decreased tractive force and flow of semi solid materials. This slippage of semi solid material at the feed rollers 3a, 3b tends to cause inaccuracies in the scaling or dispensing of the product.

At the interface of roller 3a, 3b to die block 5 there is the small die gap 5a which causes most to the material to divert down thru the die passage Sb or port of die block 5. Assisting in sealing this gap 5a is the die block 5 with its stationary surface with only the feed roller 3a, 3b moving so that there is a partial boundary layer condition in the material as it moves or smears through the roller to die gap 5a at a sufficiently low velocity. But this smearing around of semi solid material 1 and the corresponding heat of this frictional movement actually acts to add heat or temperature to the adhering material 1 on the surface of the feed roller 3a, 3b. This added heat raises the temperature of this semi solid material further and reduces the adhesion and tractive force imparted on the semi solid material 1.

With some semi solid materials an additional problem occurs in that the semi solid material can have an elevated fat content. When slippage between the roller 3a, 3b and the semi solid material 1 occurs the friction from the slippage adds heat to the semi solid material 1 along the shear path. This friction would reduce the viscosity or soften up the semi solid fat. Once this fat softens the semi solid material it is suspended in also softens and thereby reducing the ability to be driven by the counter rotating feed rollers 3a, 3b. And as it becomes softer it slips more and the softening continues to increase. After a short period of time the semi solid material in the area beyond the point at which the rollers meet or the pinch point 3c of the rollers is stiffer than the semi solid material 1 at or coming in contact with the counter rotating feed rollers 3a, 3b and passage of semi solid material is greatly reduced. At this point the heretofore known machine shown in FIGS. 1 and 2 has to be stopped to allow the semi solid material temperature to stabilize and then an attempt to restart can be made.

Figure 3:
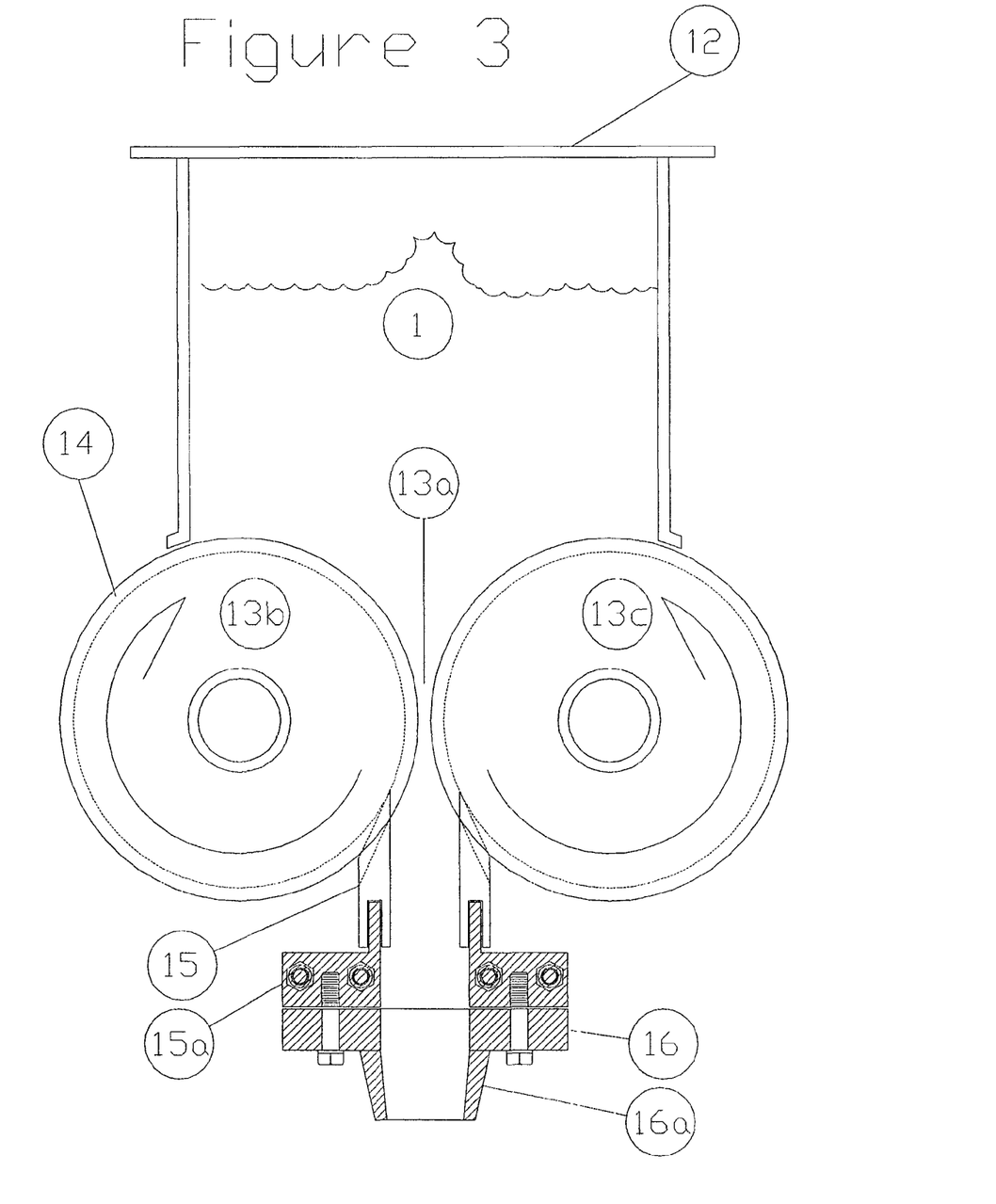
FIG. 3 shows a cutaway side view of an exemplary embodiment of the instant invention.
Figure 4:
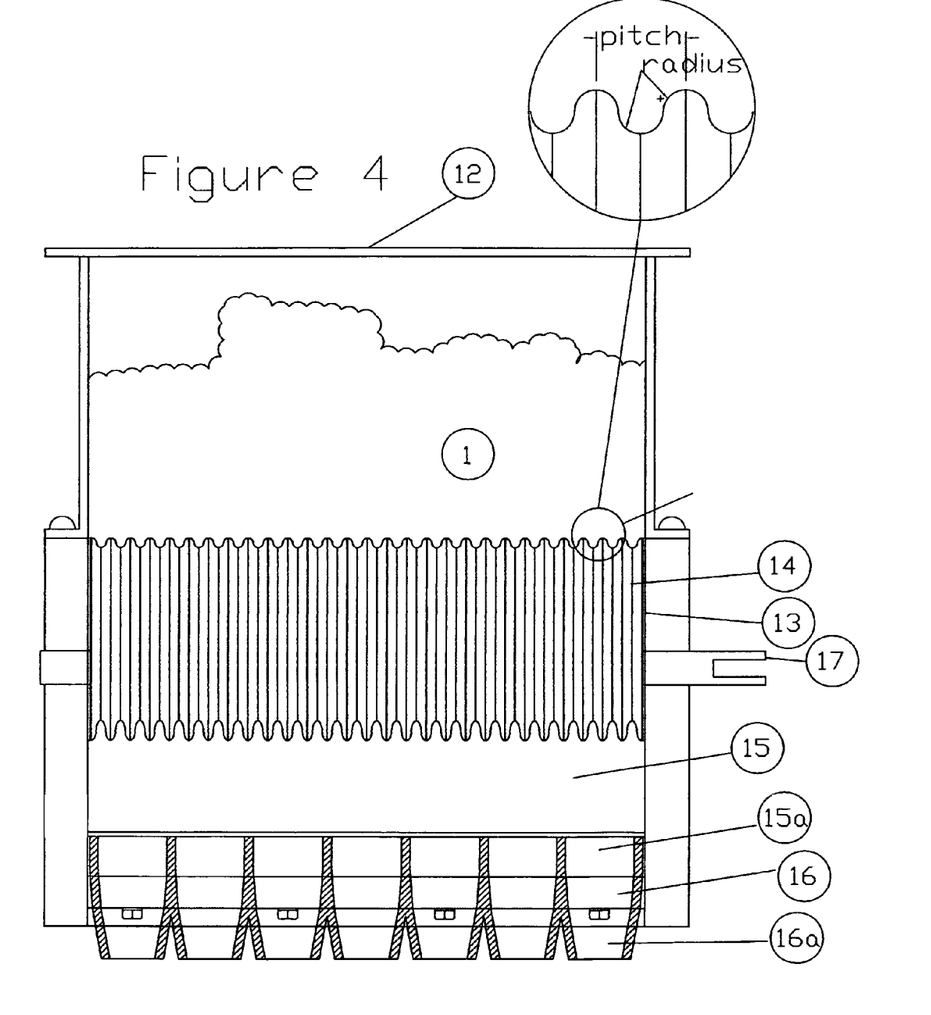
FIG. 4 shows an open front view of the embodiment of FIG. 3

FIG. 3 and FIG. 4 show an exemplary embodiment of the instant invention. In FIG. 3 and FIG. 4, a hopper 12 is provided above two counter rotating feed rollers 13A, 13B. The counter rotating feed rollers 13A, 13B have a grooved profile or contour of vertical or circumferential direction 14A, 14B and matching contoured scrapers 15A, 15B. Following the counter rotating feed rollers 13A, 13B and matching contoured scrapers 15A, 15B, a contoured scraper holder 15C is provided having tubes or passages 15D bored thru from top to bottom of scraper holder 15C leading to a dispensing point, die nozzle 16A The matching scrapers 15A, 15B are in cooperative engagement with the counter rotating rollers 13A, 13B to help prevent recirculation of the semi-solid material.

In the operation of the exemplary embodiment shown, the bulk semi solid material 1 is placed in the hopper 12 above the counter rotating feed rollers 13A, 13B. The semi solid material 1 thru the effect of gravity drops to come in contact with the counter rotating feed rollers 13A, 13B. When in contact with the counter rotating feed rollers 13A, 13B the mechanically induced rotation of the counter rotating feed rollers 13A, 13B cause the semi solid material 1 to become entrained by the counter rotating feed rollers 13A, 13B circumferential profiles 14A, 14B. As the semi solid material 1 moves with the rotation of the respective counter rotating feed rollers 13A, 13B the semi solid material 1 will come towards the center area between the counter rotating feed rollers 13A, 13B horizontal center lines. The entrained semi solid materials 1 are thus moved down towards the convergence point or "pinch point" 13C between the two feed rollers 13A, 13B. As the entrained semi solid materials 1 approach the pinch point 13C the materials are pressed or forced to the roller surface by the action of the opposing roller counter rotation. This entrained semi solid material 1 will also move downward due to the radius and rotation of the counter rotating feed rollers 13A, 13B.

In the exemplary embodiment shown the counter rotating feed rollers 13A, 13B have a profile or groves 14A, 14B which run around the outside of the counter rotating feed rollers 13A, 13B or in the circumference of the counter rotating feed rollers 13A, 13B here after referred to as circumferential grooves 14A, 14B. The counter rotating feed rollers 13A, 13B with circumferential groves 14A, 14B running in the circumferential direction, produce greater tractive forces through the increased surface area of the circumferential profiles 14A, 14B. The increased surface area provided by the circumferential grooves 14A, 14B in conjunction with the rotation creates a forcing or wedging action from the adhesion of the semi solid materials 1 being forced against the outside of the counter rotating feed rollers 13A, 13B and into the circumferential groves 14A, 14B of the counter rotating feed roller 13A, 13B By comparison, the motion of the previous horizontal profiles relied on mechanically entrapping the semi solid materials, creating a pressure force dependent on the mechanical shear strength of the material as the horizontal profile passes through the semi-solid material, as discussed above. In the instant invention, the wedging or pressing force from the coming together of the counter rotating feed rollers 13A, 13B and the respective circumferential profiles or grooves 14A, 14B adds traction or grip to the semi solid materials 1 to the counter rotating feed rollers 13A, 13B independent of the shear strength of the semi solid material 1. The instant invention thereby provides better passage of the materials thru the pinch point 13C, thru the die blocks 16 and out the die nozzles 16A.

The counter rotating feed rollers 13A, 13B with circumferential grooves or profiles 14A, 14B possess a greater ability to contact entrain semi solid materials 1. The high points or crowns 14c, 14d of the circumferential grooves 14A, 14B grasp and pull on semi solid materials 1 rather than having this material just touch and slide on the surface of rollers, as in the case of prior art machines. This enhanced starting or contact entrainment of the semi solid material 1 to the counter rotating feed rollers 13A, 13B also produces a better priming effect where once the semi solid material 1 comes in contact with the circumferential grooves 14A, 14B of counter rotating feed rollers 13A, 13B, the semi solid material 1 grips and goes thru the device without any starting or priming difficulties or lag time. Prior machines have often had issues where it took time for the semi solid material 1 to start to be entrained by the counter rotating feed rollers 13A, 13B and the time that it takes before the semi solid materials would flow thru the prior devices.

Figure 5:
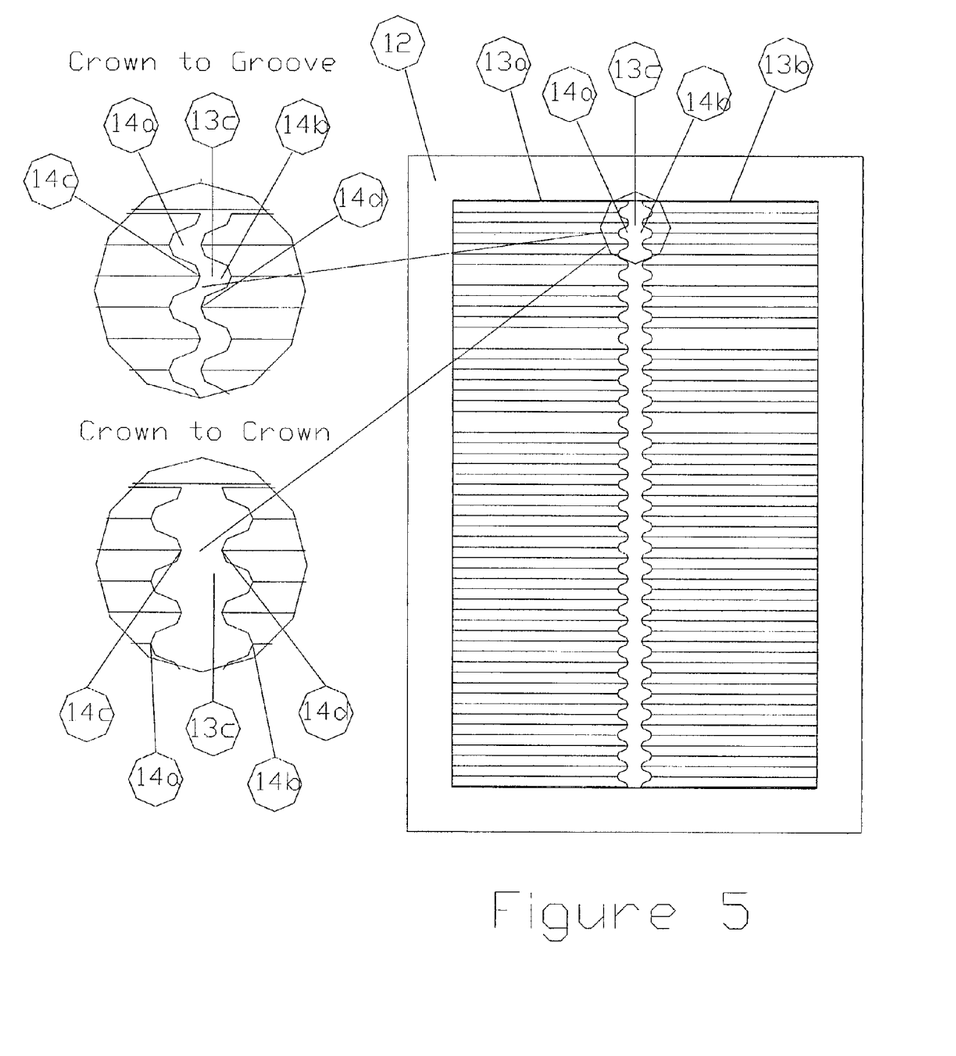
FIG. 5 shows a top down view in detail of the profile of the exemplary embodiment shown in FIG. 3.

FIG. 5 shows a top view with enlarged detail of the circumferential profiles of the exemplary embodiment shown in FIG. 3. The counter rotating feed rollers 13A, 13B of an exemplary embodiment of the grooves or profiles 14A, 14B are shown. The circumferential grooves 14A, 14B shown repeat and intermesh, this repeating dimension being typically referred to as the pitch. The radiuses, in this non-limiting example, are the same but do not need to be the same and could easily be different in radius size or dimension without deviating from the design or novelty of this invention. It should also be noted that the profiles can be of different shapes to form vertical or circumferential grooves 14A, 14B into and to the top of the grooves or crowns 14C, 14D.

FIGS. 6A and 6B and FIGS. 7A and 7B show close up, top down views of additional feed roller profiles. These variations in profile shapes may be, for example, but are certainly not limited to, a parabolic root with parabolic top section, a parabolic root with flat top section, a "v" profile where a v-shape is cut into the roller—the bottom of this v-shape may have a radiused bottom or a sharp bottom and the tops could be the same being of flat sides with radiused or sharp tops, or similar shapes that provide for a profile examples of which can be seen in FIGS. 6A, 6B, 7A, and 7B.

Figure 6A:
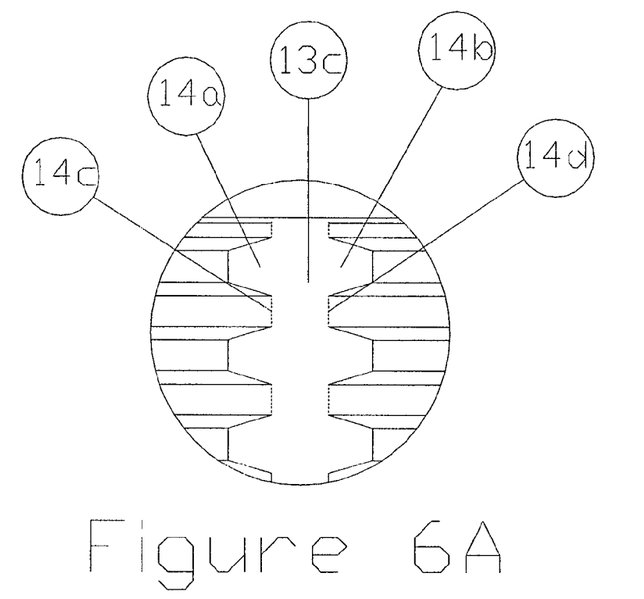
FIGS. 6A and 6B show close up, top down views of additional feed roller profiles.
Figure 7A:
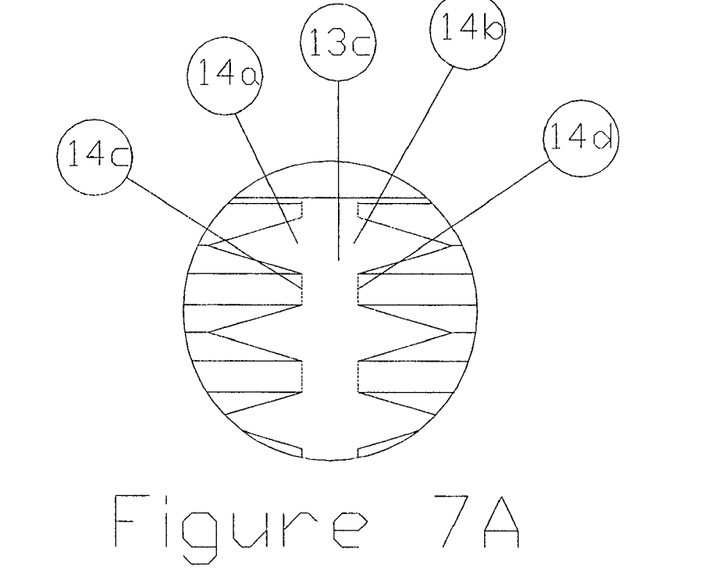
FIGS. 7A and 7B show close up, top down views of additional feed roller profiles.

FIGS. 6A and 7A show additional profile shapes in a non-offset configuration. As a non-limiting example, the rollers 13A, 13B or circumferential profiles 14A, 14B on the counter rotating feed rollers 13A, 13B could be set so that the crown 14c, 14d of the profile of one roller could be aligned and fit into the groove 14A, 14B of the profile contained on the other roller as shown if Crown to Grove of FIG. 5. This configuration further reduces the overall area of the pinch point and thereby reduces the chance of materials flowing back up through the pinch point 13C. This could also be described as a half-pitch offset.

Figure 6B:
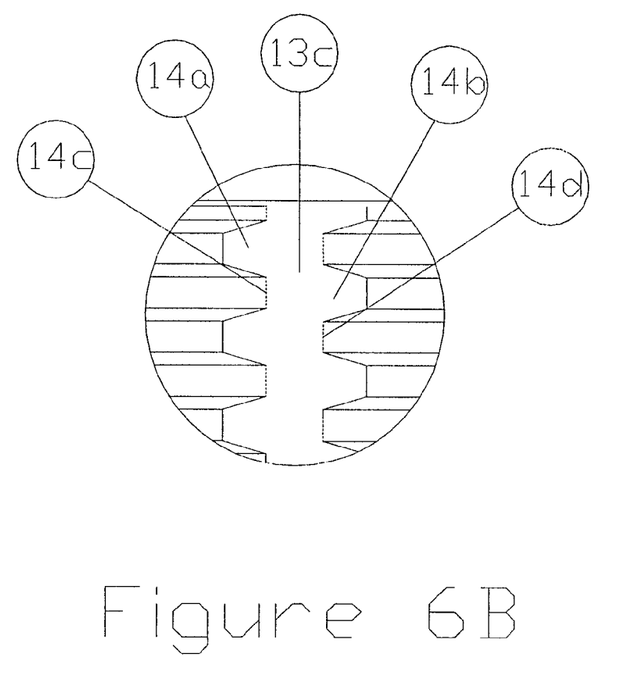
Figure 7B:
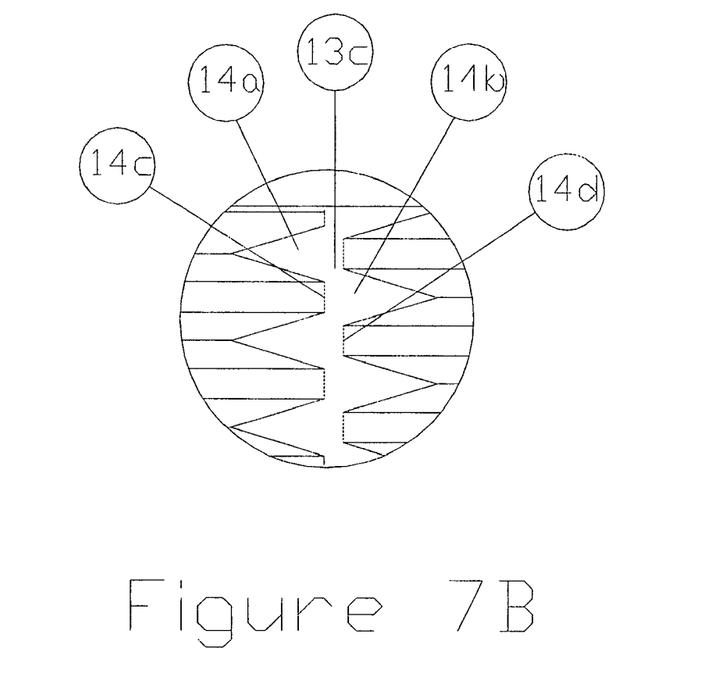

FIGS. 6B and 7B show additional profile shapes in an offset configuration. The circumferential profiles or grooves 14A, 14B of these exemplary embodiments are set so that they do not line up to one another or have no offset, such that in the crown of 14C to crown of 14D type configuration as shown in Crown to Crown of FIGS. 6B and 7B.

It should also be noted that in FIG. 3 and FIG. 4 counter rotating feed rollers 13A, 13B are both of equal diameter, it would, however, be obvious to one of ordinary skill in the art that additionally sizes and shapes could be used with either roller without departing from the spirit of the invention. Similarly, in the FIG. 3 and FIG. 4 the contoured scrapers 15A, 15B, the contoured scraper holder 15C, die block 16 and die nozzles 16A are shown as separate pieces but could just as easily be made from one piece or could be made such that the scrapers 15A, 15 B, the die block 16, the die nozzles 16A and similar components that function past the counter rotating feed rollers 13A and 13B could be made in one piece rather than in two or more pieces.

In addition to the circumferential profile groove 14A, 14B, an at least one scraper, here a pair of scrapers 15A, 15B, is provided with a profile matching the circumferential profile groove 14A, 14B of counter rotating feed rollers 13A, 13B. The matching of the profile of the scraper 15A, 15B to the circumferential profile groove 14A, 14B and counter rotating feed rollers 13A, 13B allows for a higher pressure in this exit passageway as compared to the previously known machines, like those of FIGS. 1 and 2, where a mechanically required clearance between the feed roller 3 of FIG. 1 and the die block 6 of FIG. 1 would never permit a positive seal and would therefore allow for passage of the semi solid materials 1 between the rotating feed rollers 3 and die block 5.

With respect to the exemplary embodiment of the instant invention shown, the increased pressure in the previously described exit passage or cavity of the preferred embodiment where the semi solid material 1 will flow thru and exit the die nozzles 16a with little potential for slowing due to the effects of friction or drag of semi solid material 1 relative to the cavity surfaces. This virtual elimination of the slowing of semi solid material 1 and slippage of the semi solid material 1 with respect to the circumferentially grooved 14a, 14b counter rotating feed rollers 13A, 13B produces a very consistent, positive passage of semi solid material 1 without the defects often found in the heretofore known machines. The positive passage of semi solid materials 1 reduces disturbance and/or decreases the possibility or probability of scaling decreases and/or deviations due to disruption in flow of semi solid material 1 thru the device.

It is seen from these figures and understood in this description that the circumferential profiles 14A, 14B in the counter rotating feed rollers 13A, 13B as well as the width or spacing of the pinch point 13C between the counter rotating feed rollers 13a, 13 is typically modified or suited to the product type that is being processed. For example, materials of low viscosity, such as cake icing, the circumferential profiles 14A, 14B are shallow, the pitch is generally kept narrower and the counter rotating feed rollers 13A, 13B spacing from top to top is generally kept closer. For more viscous materials, such as bread dough for example, the grooves 14A, 14B are made deeper, the pitch width increased and the counter rotating feed rollers 13A, 13B top to top spacing is wider. The circumferential profiles 14Aa, 14B of the counter rotating feed rollers 13A, 13B of the preferred embodiment may vary in size and shape depending on type of product that must be processed.

As a non-limiting example for cake icing for example, the groves can have groove radius widths of, for example, 1/32 to 1/8 of an inch with a pitch width of, for example, 1/8 to 1/2 of an inch with, for example, 1/16 to 1/4 separations between the feed roller 13A, 13B. Typical setting being 0.060 inch radius with 0.240 inch pitch and 0.100 inch roller to roller top gap. In another non-limiting example for use with stiffer mediums, such as stiff dough used in the making of hard rolls or bread dough, the rollers 13A, 13B can have grove radius widths of, for example, 1/16 to 1/4 of an inch with a pitch width of, for example, 1/4 to 1 inch with, for example, 1/8 to 3/8 inch separation between the counter rotating feed rollers 13A, 13B.

In yet another non-limiting example, cookies with inclusions, such as chocolate chunks, can require a feed roller 13a to roller 13b separation of 1/4 to 3/8 of an inch which is large enough to allow for passage of the chunks or inclusions typically used in the production of cookies. To accommodate these materials with inclusions, the counter rotating feed rollers 13A, 13B are set with a spacing that is larger than the diameter of the inclusion, as shown in the exemplary embodiment. When the medium containing these types of inclusions is passing thru the device the dough component will fill and flow in the groves of the rotating rollers and the inclusion will fit or pass through the open area between the high points of the rollers. It should also be clear that the utilization of the gap is typically in conjunction with brittle inclusions such as chocolate chunks and nuts, rather than soft or compressible inclusions such as raisins which can deform to a certain extent to pass thru a space that in it's relaxed shape it would not be able to fit thru. Though shown as a fixed spacing, the invention anticipates providing an adjustment mechanism or easy substitution of the counter rotating feed rollers 13A, 13B or mounting of the counter rotating feed rollers 13A, 13B to adjust the spacing.

It should be understood that due to pressure in the area beyond the pinch point 13C of the counter rotating feed rollers 13A, 13B there would be a tendency for the semi-solid material 1 to flow back if this were a static application but due to the movement of the material and rotation of the counter rotating feed rollers 13A, 13B the reaction to the movement of the material is limited to a reduction in maximum speed or thru put of the materials thru the pinch point 13C.

FIG. 5 shows a top down view in detail of the profile of the exemplary embodiment shown in FIG. 3. As shown in the exemplary embodiment depicted in FIG. 3 and FIG. 4, the wedging action of the semi solid material 1 occurs due to the entrainment of the semi solid material 1 within the vertically oriented grooves of the counter rotating feed rollers 13A, 13B and counter rotation of the counter rotating feed rollers 13A, 13B towards each other. The larger amount of surface area provided by the vertically oriented grooves of the exemplary embodiment shown as compared to that of a flat roller or that of a prior art roller with longitudinal saw toothed or similarly horizontally profiled grooves, like those of FIGS. 1 and 2, provides for an increased amount of overall pressure over these previous machines. Additionally, as the separation between the crowns 14C, 14D of the counter rotating feed rollers 13A, 13B decreases, the ability of the material to flow back decreases due to a boundary layer condition and the depth of the semi solid material in contact with the roller faces. This effect also causes a portion of the semi solid material 1 to be pressed into the circumferential grooves 14A, 14B of the roller where it is held by a pressing force and moved by the counter rotation.

This wedging action increases as the semi solid materials start to approach the pinch point of feed rollers 13C. The increasing wedging effect of the semi solid materials allows the semi solid materials 1 to be pressed into the circumferential feed roller grooves 14A, 14B. The greater the wedging action or the more the semi solid materials 1 approach the counter rotating feed rollers 13A, 13B pinch point 13C, the greater the force that presses the semi solid materials towards the roller surface and into the feed roller grooves 14A, 14B. The increasing pressure of the semi solid material 1 against the feed roller 13A, 13B and into the grooves 14A, 14B of the feed rollers 13A, 13B causes or improves the grip or traction that the feed roller 13A, 13B or grooves 14A,14B have to the semi solid material 1 and conversely increases the pressure of the material being pushed out below the pinch point 13C.

As noted above, the vertical orientation of the circumferential grooves 14A, 14B allow the circumferential grooves 14A, 14B to be in communication with the scrapers 15A, 15B. With the circumferential grooves 14A, 14B running in the circumferential direction, the scrapers 15A, 15B abut with and create a seal with rollers 13A, 13B and the circumferential grooves 14A, 14B. The scrapers can be produced with a profile that matches those of the feed roller 13A, 13B with its circumferential grooves 14A, 14B. When placing the profiled scraper 15A, 15B member to the feed rollers 13A ,13B and matching the profiles, a very tight seal is produced as opposed to the need for clearance of the roller relative to the die block as with existing machines. The tight seal of the instant invention removes the semi solid material instead of allowing the recirculation, as occurs in the previously known machines like those of FIGS. 1 and 2.

This seal also prevents the traditional leakage due to feed roller 3 to die block 5 clearance 5A found in these previously known devices, such as those shown in FIG. 1 and FIG. 2. Additionally, the leakage is also a point of variability, as if materials leak the flow thru this area would result in an inconsistent rate of distribution and scaling of semi solid material from the machine. If the leak is inconsistent or there is variation in the flow of the semi solid material it will produce a deviation in scaling of product in that the product is scaled in relation to the rotation of the rollers and the amount of materials that exit the die nozzles 6a, making scaling and metering more difficult in the prior art devices. As scrapers 15A, 15B of the instant invention create a positive seal with the rollers 13A, 13B and the profiles 14A, 14B, leakage is minimized and a further source of waste and variability is eliminated as the semi solid material 1 is passed through the die nozzle 16a.

The die block 16 in the instant invention can be a slab of material, for example but certainly not limited to an aluminum slab, or several separate pieces. The die block 16 running the length of the rollers 13A, 13B with tubes, orifices, or passages 16A bored thru from top to bottom. In the exemplary embodiment, the tubes, orifices, or passages 16A going from the rollers to the discharge nozzle 16A out the bottom of the die block 16 are the material removal paths or passages, the material is dispensed at the end of the tubes, orifices, or passages 16A. These can be a standard size. Additionally, the exit nozzle 16A can be made to be fixed or detachable. In the case of a detachable nozzle array 16A, the user unbolts the nozzle 16A and installs other nozzles that would be of a determined diameter. Additionally, metering devices, such as cutters or other apportionment devices, can be used to portion the outflow from the device and can be added to the die block 16 or the nozzle array 16A.

Additionally, in an exemplary embodiment of the instant invention a non-stick coating, for example but certainly not limited to TEFLON, is utilized within the die block 15 and die block passages 15A and a non-stick coating, a solid machined die nozzle, or a machined solid non-stick insets can be used for the inner surface of the die block 15 or die nozzles 15A. The surface area drag in the die block 16 and/or nozzles 16 becoming most pronounced when producing confectionary products which pass through die nozzles 16A. This is due to the size of the final confectionary products, which are usually quite small and require small diameter die nozzles 16A. A non-limiting example for instance includes the centers for chocolate coated candies that are much narrower rather than, by comparison, for cookies which normally are larger in size and therefore use a larger discharge die nozzle or orifice 16A. Thus, reduction of drag in conjunction with the higher pressure at the convergence point 13C and lower overall surface area of the convergence point 13C provide for enhanced outflow performance in the instant invention.

Another significant benefit of the circumferential roller grooves 14A, 14B and the scrapers 15A, 15B with matching profiles of the instant invention is the positive seal that the scrapers 15A, 15B forms to the feed roller 13A, 13B allows the effectively complete removal of all semi solid materials 1 from the feed rollers 13A, 13B. In the previous machines shown in FIG. 1 and FIG. 2 the plurality of roller grooves 4 run parallel to the feed roller 3 rotational center line and have a saw tooth shape. This longitudinal groove 4 does provide increased traction by maintaining material in the longitudinal grooves which in turn hold additional approaching semi solid material 1, thereby decreasing slippage of the product relative to the roller, as compared to the operation of semi solid material 1 in contact with a smooth or groove less roller. But the groves 4 being in a longitudinal direction or parallel to the rotational axis of the shaft which the rollers rotate about does not permit any mechanical removal of the semi solid materials 1 from the groove 4 by a means such as a scraper.

By comparison, in the previous designs, like those of FIGS. 1 and 2, there can be no positive seal between the die block 5 and the counter rotating rollers 3 due to the orientation of the profile 4 of the rollers 3. There always remains in these prior machines an amount of semi solid material in the grooves 4 of the counter rotating rollers 3 that passes through the clearance 5a between the rotating rollers 3A, 3B and the die block 5. The machine is not able to remove this material so it continues to rotate in the grove 4 of the counter rotating rollers 3. With the case of cookies which use eggs or egg products there are hygienic concerns about this semi solid material 1 remaining in the grooves 4 of the rotating rollers 3A, 3B.

Therefore, the semi solid material 1 may remain in this plurality of groves 4 for a significant period of time. This is typically referred to as the "re-circulating" of semi solid materials in the groves of the rollers which typically extends to the depth of the grove in the feed rollers 3A, 3B plus the clearance of the rollers to the die block 5. This indeterminate retention of the semi solid material 1 can present health or hygienic issues in these previously known devices. One example is a semi solid material with nuts or other allergens in which the mixture would need to be cleaned from the rollers. Another example is possible bacterial growth when the semi solid material 1 contains egg products such as when the semi solid material is a cookie dough mixture which may contain eggs or egg products.

In the instant invention the positive seal with the die block 16 with the scrapers 15A, 15B, prevents recirculation. The roller scraper 15A, 15B profile maintains an intimate contact with the circumferential groove 14A, 14B surface of the feed roller 13A,13B and due to the mechanically induced rotation of the feed rollers 13A, 13B the roller scrapers 15A, 15B removes the semi solid material from the rollers 13A ,13B surface and from within the feed roller grooves 14A, 14B as the surface of the roller 13A, 13B moves towards the scrapers 15A, 15B. When the semi solid material has been removed from the feed rollers 13A, 13B surface and from inside the grooves 14A, 14B the semi solid material I can not return thru the point of entry or the pinch point 13C because of the continued movement of the feed rollers 13A, 13B and the entrained semi solid material 1. The semi solid material 1 must therefore pass thru the cavity formed by the roller scrapers 15A, 15B, the roller scraper holder 15a, die block 16 and the die nozzles 16a and exit from the end of the die nozzle 16a.

The position of the scrapers 15A, 15B and force of contact of the scrapers 15A, 15B to the counter rotating feed rollers 13A, 13B are a function of the mounting of the scrapers 15A, 15B on the scraper holder 15C as well as a to a larger extent the pressure built up or produced within the confines of the feed rollers the die block 16, the passages 15D, the die block nozzles 16A, and the scrapers 15A, 15B. So that as this pressure increases it also increases the pressure or force that the scrapper places upon the rollers 13A, 13B, providing a self energizing pressure effect. Additionally, though the scrapers 15A, 15B are shown as being identical, variations in the size, shape and placement are well within the spirit of the invention.

Additionally, in the exemplary embodiment the feed roller scrapers 15A, 15B are of a simple flat section that contains a profile to match the profile of the feed rollers 13A,13B. Many semi solid materials 1 will or may contain abrasive materials such as but not limited to sugar granules or crystals, flour, candy segments or pieces containing candy fragments. These materials or ingredients are typically abrasive and may tend to wear the materials that they come in contact with or the surfaces that they move against. So in the instant invention, to accommodate the abrasive wear, rollers 13A, 13B are comprised of harder material than the softer scrapers 15A, 15B, such that the scraper 1 5A, 15B would wear preferentially. The simpler scraper of the preferred embodiment would also be a lower cost replaceable piece rather than the higher cost profiled counter rotating feed rollers 13A, 13B, Once the semi solid material 1 flows out from the die nozzle 16a the semi solid material 1 will have the shape of the die nozzle 16a opening and the semi solid material 1 will be further processed. For example, in the production of fruit and or granola bars, the extruded material may be kept in a steady stream from the nozzle, then rolled between a pair of parallel rollers to get a flatter profile and finally cut into bar length sections. In the production of cookies a portion of cookie material will exit the die nozzle 16a and be cut off by mechanical action. Candies and chocolate centers are also typically produced by extruding them from a die nozzle and cutting the extruded material off to create a proper portion.

The feed roller grooves 14A, 14B also provide a way of removing air that may be trapped or entrained in the semi sold material 1. As the feed rollers 13A, 13B counter rotate as indicated in FIG. 4 they bring the semi solid material towards the pinch point 13C. As the semi solid material approaches the pinch point 13C the pressure of the semi solid materials 1 to the feed roller grooves 14A, 14B increases, air that may be suspended in the semi solid materials will come in contact with the profiles of feed rollers 13A, 13B and can vent to the bottom of the grooves 14A,14B. Air that passes into the bottom of the grooves 14A, 14B is pressed back or opposite to the direction of the movement of the feed roller 13A, 13B to where it can vent to atmosphere The counter rotation of the feed rollers 13 will start to wedge the semi solid material 1 and cause the semi solid material 1 to flow back in towards the center of the hopper 2 above the feed rollers 13 and away from the pinch point 13C. This flowing of the semi solid material 1 will allow some of the air that may be suspended in the semi solid material 1 to move and be released and some of the semi solid material I air will go towards the feed roller grooves 14, where the feed roller grooves 14 can open or intersect the air pocket and allow the air a passage way to remove it from out of the semi solid material 1 as previously described.

By removing this air a more consistent and uniform flow of semi solid material 1 occurs, which will also be able to provide for more accurate portioning or scaling of the extruded semi solid material. In application of icing to a cake the removal of air is also beneficial in that the icing on the cake will not have voids or a porous finish due to air inclusion. By comparison, when air pockets approached in the heretofore known machines which have grooves running across the face of the feed rollers 3A, 3B, as seen in FIG. 1 and FIG. 2, the air could be entrained in the semi solid material and be pressed through the pinch point of the rollers. The entrained or entrapped air could also enter and remain in the groove 4 of the known machines as it passes thru the pinch point then continues in the extruded semi solid material to give a scaling error. Thus, the instant invention provides for more accurate scaling in addition to other benefits.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A metering device dispensing semi-solid food material in controlled amounts, comprising:
a hopper containing the semi-solid food material is placed;
two counter rotating feed rollers with matched, grooved circumferential profiles, the two counter rotating feed rollers each having a horizontal centerline for each grooved profile the rollers being in a roller section communicating with the hopper and mechanically driven in a counter rotating fashion;
two scrapers matching the grooved circumferential profile of and in communication with each of the counter rotating feed rollers; and
an at least one die block and an at least one die nozzle coupled to and communicating with the two scrapers, wherein when the semi-solid food material is in contact with the counter rotating feed rollers the mechanically induced rotation of the counter rotating feed rollers causes the semi solid food material to become entrained and squeezed by the counter rotating feed rollers within the circumferential profiles spreading across and between the circumferential profiles as it is squeezed and entrapped gases and air are removed from the semi-solid material on and between the rollers and the rollers move the entrained semi-solid food material downward under high pressure due to the rotation of and spacing between the feed rollers and as the semi solid material moves with the rotation of the respective feed rollers the semi solid material comes towards the center of the roller section between the feed roller center lines under high pressure and is fed under high pressure out past the scrapers through the at least one die block and the corresponding at least one die nozzle.

2. The metering device for dispensing semi-solid food material in controlled amounts of claim 1, wherein the two matching grooved circumferential profiled scrapers are in intimate contact with the grooved circumferential profiles of the counter rotating rollers such that a positive seal is provided preventing recirculation of entrained semi-solid food material.

3. The metering device for dispensing semi-solid food material in controlled amounts of claim 1, wherein the grooved circumferential profiles of the counter rotating rollers extend the length of the counter rotating rollers.

4. The metering device for dispensing semi-solid food material in controlled amounts of claim 1, wherein the two scraper extend and match the length of the profiles on the two counter rotating rollers.

5. The metering device for dispensing semi-solid food material in controlled amounts of claim 1, wherein the grooved circumferential profiles of the two counter rotating rollers form a radius and the at least one die block includes the two matching grooved circumferential profiled scrapers mounted thereon with an identical radius machined into the two scrapers from front to back thereon.

6. The metering device for dispensing semi-solid food material in controlled amounts of claim 1, wherein the semi-solid material flows through the die block and the at least one nozzle with a positive pressure.

7. The metering device for dispensing semi-solid food material in controlled amounts of claim 1, further comprising a non-stick surface on the at least one die block or the at least one die nozzle or a non-stick insert for the inner surface of at least one of the at least one die nozzles.

8. The metering device for dispensing semi-solid food material in controlled amounts of claim 7, wherein the non-stick coating is Teflon.

9. The metering device for dispensing semi-solid food material in controlled amounts of claim 1, wherein the semi-solid food material is one of a chocolate coated candy centers, cookies, cookies with inclusions, hot cross buns, brownie batter, icing, dough, and dough with inclusions.

10. The metering device for dispensing semi-solid food material in controlled amounts of claim 1, wherein the profiles are substantially perpendicular to the horizontal centerlines of the counter rotating rollers or substantially vertical relative to the orientation of the counter rotating rollers.

11. The metering device for dispensing semi-solid food material in controlled amounts of claim 1, wherein the circumferential profiles further comprise grooves with profiles having high points or crests and low points or valleys, the profiles of the circumferential rollers entraining the semi solid material in the high points or crests and low points or valleys across the entire surface of counter rotating feed rollers.

12. The metering device for dispensing semi-solid food material in controlled amounts of claim 10, wherein the semi-solid food material is spread between the grooves within and across the circumferential profile and held there between with increased pressure.

13. The metering device for dispensing semi-solid food material in controlled amounts of claim 12, wherein the entrainment of the semi solid material within the vertically oriented circumferential profiles together with the counter rotational movement of the counter rotating feed rollers pushes the entrained semi solid material down to a convergence point between the two counter rotating feed rollers.

14. The metering device for dispensing semi-solid food material in controlled amounts of claim 13, wherein the distance between the roller surfaces is proportional to the viscosity and the depth of the semi solid material in contact with the roller faces.

15. The metering device for dispensing semi-solid food material in controlled amounts of claim 14, wherein the mechanically driven rotation of the rollers moves the semi-solid food materials down and inwards towards the convergence point of the two counter rotating rollers, the movement from the hopper to the pinch point causes the material to first enter and fill or wedge across and into the grooves of the circumferential profiles of the two counter rotating feed rollers and between the grooves of the circumferential profiles.

16. The metering device for dispensing semi-solid food material in controlled amounts of claim 11, wherein the size and shape of the contoured profiles are varied based on the type of semi solid material.

17. The metering device for dispensing semi-solid food material in controlled amounts of claim 11, wherein the profiles on the two counter rotating feed rollers are matched such that the high point in each profile are matched opposite one another.

18. The metering device for dispensing semi-solid food material in controlled amounts of claim 11, wherein the profiles on the two counter rotating feed rollers are matched such that the high point of one meets the low point in the other.

19. The metering device for dispensing semi-solid food material in controlled amounts of claim 11, the grooves have a groove radius with a width of between about 1/32 to 1/8 of an inch with a pitch width of between about 1/8 to 1/2 of an inch with and 1/16 to 1/4 of an inch separation between the two counter rotating feed rollers.

20. The metering device for dispensing semi-solid food material in controlled amounts of claim 15, further comprising an adjustment mechanism or substitution mechanism allowing for the adjustment or substitution of at least one of the two counter rotating feed rollers to adjust the width of the pinch point.

21. The metering device for dispensing semi-solid food material in controlled amounts of claim 15, wherein the grooves are formed from one of a parabolic root with parabolic top section, a parabolic root with flat top section, or a v profile with a v-shape cut into the roller with the bottom of the v-shape having a radiused bottom or a sharp bottom and the tops having flat sections or sharpened sections as tops.

22. The metering device for dispensing semi-solid food material in controlled amounts of claim 1, wherein the two scrapers produce a positive seal with the respective two counter rotating rollers, thereby increasing operating pressure and providing positive containment of the semi-solid material.

23. The metering device for dispensing semi-solid food material in controlled amounts of claim 15, wherein the circumferential profiles are substantially vertical relative to the horizontal centerline of the rollers and the counter rotation of the substantially vertical circumferential profiles permits removal of air that may be entrained or entrapped in the semi solid material as it is moved between the rollers.

24. A method for metering and dispensing semi-solid food material in controlled amounts, comprising:
preparing the semi-solid food material and depositing same in a hopper;
entraining and squeezing, said semi-solid food material in between two counter rotating feed rollers with grooved, circumferential profiles, the rollers being in communication with the hopper, wherein the semi-solid food material is spread between the grooves along the length of the roller within the circumferential profiles and held therebetween;
moving said semi-solid food material, due to the rotation of and spacing between the two counter rotating feed rollers, under high pressure through a convergence point between the counter rotating feed rollers and removing air that may be entrapped in the semi solid material, the movement pushing at least a portion of the semi-solid material into communication with an at least one scraper in communication with the roller to remove the portion of the semi-solid food material from the roller; and
ejecting said semi-solid food material, both the portion that was in communication with the scrapers and the remaining portion, through an at least one die block having an at least one nozzle.

25. The method for metering and dispensing semi-solid food material in controlled amounts of claim 24, wherein said at one scraper is in intimate communication with the grooved circumferential profile such that it makes a positive seal with said two counter rotating feed rollers having said circumferential profiles.

* * * * *